United States Patent
Iwasaki et al.

(10) Patent No.: US 6,628,589 B2
(45) Date of Patent: Sep. 30, 2003

(54) OPTICAL REPRODUCING ABERRATION COMPENSATION SYSTEM HAVING APPROPRIATE CORRECTION SIGNALS APPLIED TO A LIQUID CRYSTAL DETECTOR

(75) Inventors: Masayuki Iwasaki, Tsurugashima (JP); Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/816,073

(22) Filed: Mar. 26, 2001

(65) Prior Publication Data

US 2001/0033541 A1 Oct. 25, 2001

(30) Foreign Application Priority Data

Mar. 28, 2000 (JP) ............................... 2000-89442

(51) Int. Cl.$^7$ ................................. G11B 3/90
(52) U.S. Cl. ................ 369/53.19; 369/112.02; 369/44.32
(58) Field of Search ................. 369/112.02, 44.32, 369/53.19, 44.23; 359/637

(56) References Cited

U.S. PATENT DOCUMENTS

| | | | | |
|---|---|---|---|---|
| 5,886,496 A | * | 3/1999 | Furukawa et al. | 369/109 X |
| 6,137,754 A | * | 10/2000 | Furukawa et al. | 369/44.32 |
| 6,246,648 B1 | * | 6/2001 | Kuribayashi | 369/44.32 |
| 6,320,699 B1 | * | 11/2001 | Maeda et al. | 359/637 |
| 6,411,576 B1 | * | 6/2002 | Furukawa et al. | 369/53.19 |
| 6,430,130 B1 | * | 8/2002 | Furukawa | 369/53.19 |
| 6,449,236 B2 | * | 9/2002 | Wals et al. | 369/122.02 |

FOREIGN PATENT DOCUMENTS

JP 10-20263 1/1998

OTHER PUBLICATIONS

Pub. #2002/0060958 A1.*

* cited by examiner

*Primary Examiner*—Aristotelis M. Psitos
(74) *Attorney, Agent, or Firm*—Finnegan, Henderson, Farabow, Garrett & Dunner, L.L.P.

(57) ABSTRACT

An apparatus and a method are provided for compensating an aberration occurring in a reflected light beam from a recording medium. The apparatus includes a liquid crystal unit including a first electrode layer having divisional electrodes and a second electrode layer, and a liquid crystal element which provides a light beam with a phase change when an electric field is applied; a detector for receiving the reflected light beam through the liquid crystal unit to generate a detection signal; a voltage generator for generating voltages to be applied to the divisional electrodes; and a controller for performing aberration compensation control by changing the applied voltages to each of the divisional electrodes with reference to an applied reference voltage to a predetermined divisional electrode. The controller determines the applied reference voltage based on an amplitude change of the detection signal when the applied voltages to the divisional electrodes are changed.

9 Claims, 12 Drawing Sheets

OPTICAL REPRODUCING ABERRATION COMPENSATION SYSTEM HAVING APPROPRIATE CORRECTION SIGNALS APPLIED TO A LIQUID CRYSTAL DETECTOR

FIELD OF THE INVENTION

The present invention relates to an aberration compensating apparatus for use with a recording and/or reproducing apparatus of an information recording medium such as an optical disc, and a driving method therefor.

DESCRIPTION OF THE RELATED ART

There are optical discs such as a CD (Compact Disc) and a DVD (Digital Video Disc or Digital Versatile Disc) as well-known information recording media for optical recording and reproduction of information. Furthermore, the optical discs are of various types, for example, optical discs for reproduction only, write-once optical discs on which only additional recording can be done, and rewritable optical discs on which information can be erased and re-recorded.

Research and development are in progress for realizing high-density optical discs and optical pickups and information recording and/or reproducing apparatus (hereinafter referred to as recording/reproducing apparatus) applicable to the high-density optical discs. In addition, research and development are also pursued for realizing optical pickups and information recording/reproducing apparatus having the capability to be used for optical discs of different types.

A method of coping with the high-density discs by increasing a numerical aperture (NA) of an objective lens provided in the pickup apparatus has been considered. Another method is the use of a light beam having a shorter wavelength.

However, the aberration of the light beam caused by an optical disc is increased as the numerical aperture NA of the objective lens is increased or a light beam having a shorter wavelength is used. This makes it difficult to improve accuracy of the recording/reproduction performance of information.

For example, when an objective lens having a large numerical aperture is used, the amount of birefringence distribution, which depends on the incidence angle, is increased at the pupil surface of the optical disc, since the range of the incidence angle of the light beam to the optical disc is increased. This creates a problem of spherical aberration due to the birefringence becoming more influential. In addition, when using an objective lens having a large numerical aperture and a light beam having a shorter wavelength, the influence of coma aberration can not be negligible if the incident angle of the light beam to the normal direction (tilt angle) of the optical disc tilts at the time of recording or reproduction.

As described above, optical discs of different types, for example, CDs and DVDs, differ in structure such as substrate (i.e., transparent cover layer) thickness of the discs in recording density, and the like. Consequently, the influence of aberrations such as spherical aberration, coma aberration, or astigmatism differs according to the disc type, thus, making it difficult to develop a compatible optical pickup and an information recording/reproducing apparatus. In addition, the magnitudes of aberration are different even for optical discs of the same type, since the substrate thickness varies due to, for example, variations in the manufacturing process.

In order to reduce the effects of aberrations, a conventional pickup has been proposed which comprises a liquid crystal unit for aberration compensation. As such a liquid crystal unit, there is, for example, such a unit disclosed in the Japanese Patent Application Kokai H10-20263.

FIG. 1 is a schematic view of an example of the liquid crystal unit. The liquid crystal unit is composed so that a liquid crystal element C is held between transparent electrode layers A and B opposing each other. The orientation state of the liquid crystal element C can be changed by adjusting the voltage applied between the transparent electrode layers A and B. It is designed so that incident light entering on the side of one transparent electrode layer A (or B) exits on the side of the other transparent electrode layer B (or A) and is provided with a birefringence change corresponding to the orientation state of the liquid crystal element C as the light passes therethrough.

Furthermore, the transparent electrode layers A and B are formed in a divided manner, for example, divided into a plurality of transparent electrodes a1, a2, and a3, and b1, b2, and b3. The transparent electrodes a1, a2, and a3 are electrically separated from each other, and the transparent electrodes b1, b2, and b3 are also electrically separated from each other.

Consequently, because the liquid crystal element C can be adjusted to have a plurality of variously oriented states by applying a different voltage between the transparent electrodes opposing each other, for example, between the transparent electrodes a1 and b1, a2 and b2, and a3 and b3 respectively, incident light can be provided with birefringence changes simultaneously corresponding to each of the oriented states. Thus, an aberration such as spherical aberration or coma aberration occurring in the optical path can be compensated by suitably adjusting the plurality of oriented states of the liquid crystal unit. As was mentioned above, a difference in substrate thickness can produce various cases, for example, one where the aberration is larger on the peripheral portion than in the central part of the optical path, or one where the aberration is smaller on the peripheral portion.

The liquid crystal unit having concentrical electrodes as shown in FIG. 1 is discussed as an example and a detailed description will be given by referring to FIG. 2. FIG. 2 shows the phase difference caused by a liquid crystal element depending upon the applied voltage. For example, incident light is provided with a phase difference by making the electrodes b1–b3 equipotential, by setting the electrode a1 as a reference voltage V1 (for example, V1=2 V), and by applying the voltages to the electrodes a2 and a3 different from that of the electrode a1. In order to increase the phase difference along the outer direction against the central part of an optical path, voltages V2 and V3 applied to the electrodes a2 and a3 are increased (for example, V2=2.2 V and V3=2.4 V when V1=2 V). In order to decrease the phase difference along the outer radius direction, the voltages V2 and V3 applied to the electrodes a2 and a3 are decreased (for example, V4=1.8 V and V5=1.6 V when V1=2 V).

However, the conventional liquid crystal units are required to generate a large amount (range) of phase difference for increasing or decreasing the phase difference in the other areas against the reference compensatory area.

OBJECT AND SUMMARY OF THE INVENTION

The present invention has been made to overcome the above-described problems, and it is an object of the present invention to provide a high-performance aberration compensating apparatus capable of decreasing the required amount of phase difference, and a method thereof.

To achieve the object, according to one aspect of the present invention, there is provided an aberration compensating apparatus for compensating an aberration occurring in a light beam, the light beam being applied to a recording medium and reflected by the recording medium through an optical path of an optical system, which comprises a liquid crystal unit including a first electrode layer having a plurality of divisional electrodes electrically separated from each other in the same plane and a second electrode layer, and a liquid crystal element provided between the first and second electrode layer which provides a light beam passing therethrough with a phase change when an electric field is applied; a detector for receiving the reflected light beam through the liquid crystal unit to generate a detection signal; a voltage generator for generating voltages to be applied to each of the plurality of divisional electrodes; and a controller for performing compensation control for the aberration by changing the applied voltages to each of the divisional electrodes with reference to an applied reference voltage to a predetermined divisional electrode of the first electrode layer, wherein the controller determines the applied reference voltage based on an amplitude change of the detection signal when the applied voltage to each of the plurality of the divisional electrodes are changed.

According to another aspect of the present invention, there is provided a method of compensating an aberration occurring in a light beam, the light beam being applied to a recording medium and reflected by the recording medium through an optical path of an optical system, which comprises the steps of providing a liquid crystal unit including a first electrode layer having a plurality of divisional electrodes electrically separated from each other in the same plane and a second electrode layer, and a liquid crystal element provided between the first and second electrode layer which provides a light beam passing therethrough with a phase change when an electric field is applied; receiving the reflected light beam through the liquid crystal unit to generate a detection signal; generating voltages to be applied to each of the plurality of divisional electrodes; and performing compensation control for the aberration by changing the applied voltages to each of the divisional electrodes with reference to an applied reference voltage to a predetermined divisional electrode of the first electrode layer, wherein the step of performing compensation control determines the applied reference voltage based on an amplitude change of the detection signal when the applied voltage to each of the plurality of the divisional electrodes are changed.

DETAILED DESCRIPTION OF THE PREFERRED EMBODIMENTS

Referring to the attached figures, the preferred embodiments of the present invention will be described in detail.

Figure 3:
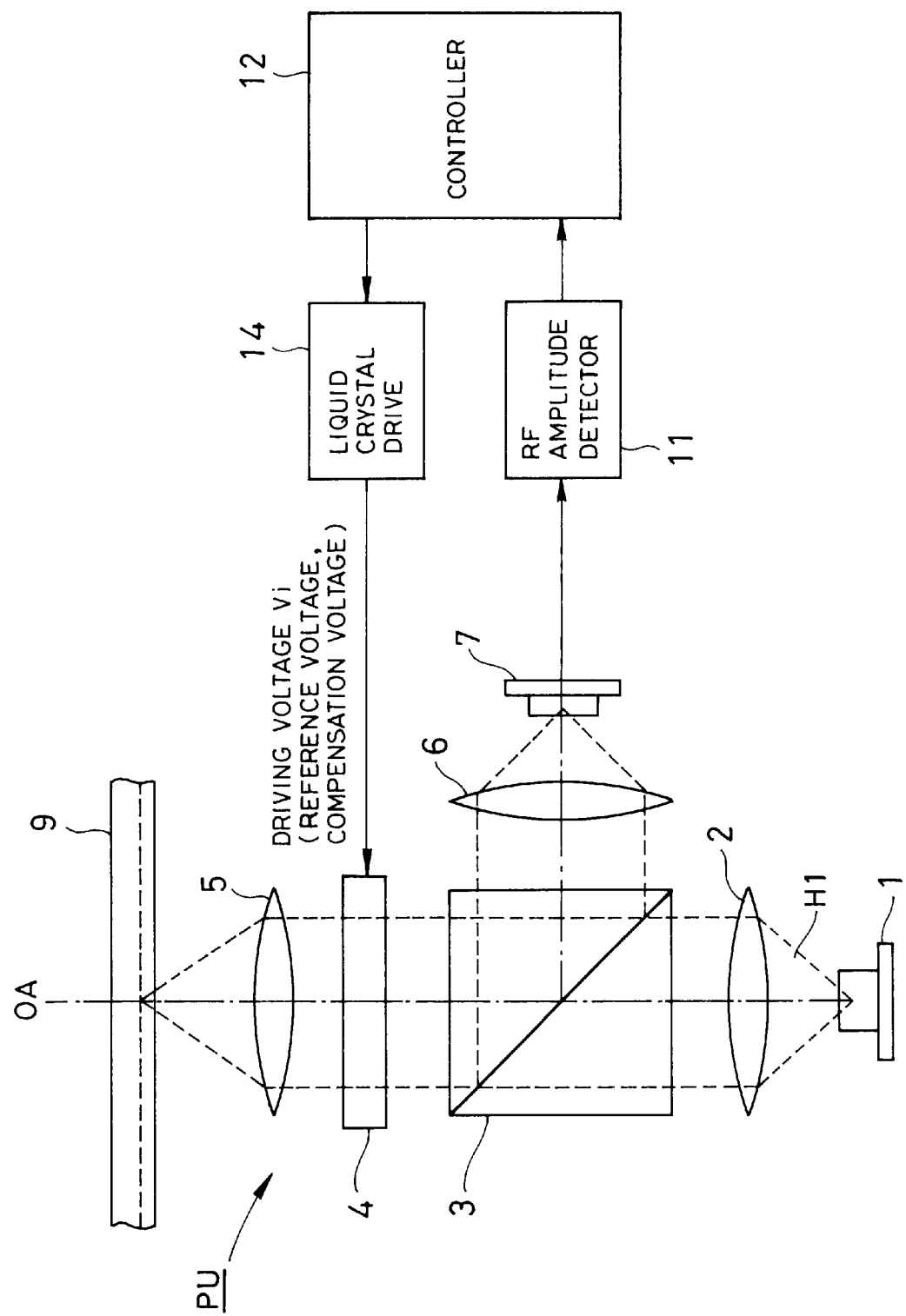
FIG. 3 is a schematic view showing the configuration of an aberration compensating apparatus provided in an information recording/reproducing apparatus.

FIG. 3 is a schematic view of a configuration of an aberration compensating apparatus provided in an information recording/reproducing apparatus.

In FIG. 3, an optical pickup PU includes a light source 1 for emitting a laser beam H1, a beam splitter 3, an aberration-compensation optical unit 4, an objective lens 5, a condenser lens 6, and a photo detector 7. The optical elements 1–7 are arranged along optical axis OA.

The light beam H1 emitted from the light source 1 in the optical pickup is reflected by an optical disc 9, and the reflected light is detected by the photo detector 7. The detected RF signal is transmitted to an RF amplitude detector 11. The RF amplitude detector 11 detects the envelope of the received RF signal, and transmits the envelope signal to a controller 12 as an RF amplitude signal. The controller 12 supplies a control signal to a drive unit 14 for driving the aberration-compensation optical unit 4 according to the received RF amplitude signal. The drive unit 14 generates a control voltage (Vi) to be applied to the aberration-compensation optical unit 4 in response to the control signal, and supplies the control voltage (Vi) to the aberration-compensation optical unit 4.

Figure 4:
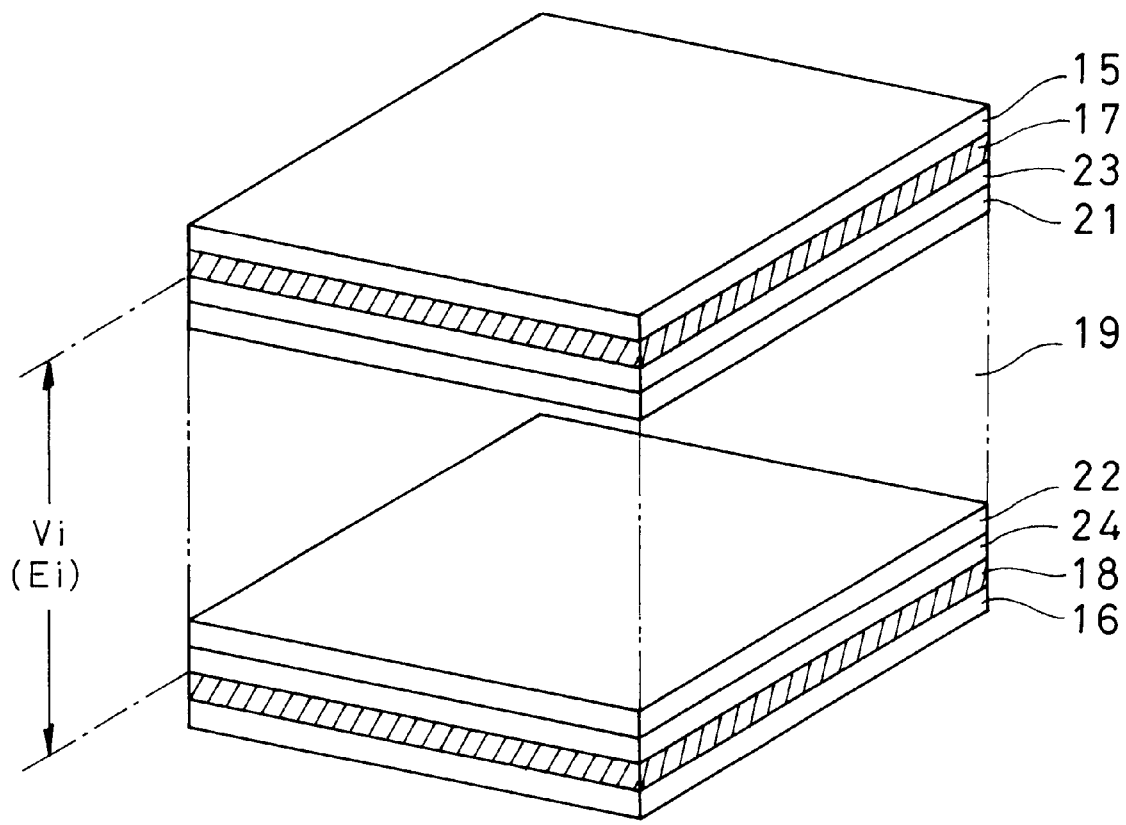
FIG. 4 is a schematic perspective view of a configuration of an aberration-compensation optical unit.

The aberration-compensation optical unit 4 includes an electro-optic element which generates an electro-optic effect by the electric field. More specifically, it includes a liquid-crystal optical element which causes birefringence changes corresponding to the magnitude of control voltage Vi applied by the drive unit 14. The aberration-compensation optical unit 4, as shown in FIG. 4, is configured so that a liquid crystal element 19 (hereinafter, simply referred to as "liquid crystal") is held between two insulating substrates 15 and 16, such as transparent glass substrates, so as to be enclosed therein. More particularly, formed on the liquid crystal 19 are liquid-crystal orientation layers 21 and 22, insulating layers 23 and 24, and electrode layers 17 and 18.

When the control voltage Vi is applied between the electrode layers 17 and 18, the orientation of the liquid crystal molecules in the liquid crystal 19 changes corresponding to the electric field Ei generated by the control voltage Vi. As a result, the phase of light passing through the liquid crystal 19 changes due to the birefringence of the liquid crystal 19. That is, the polarized state (phase) can be controlled by the control voltage Vi applied to the liquid crystal 19.

In addition, any side of the insulating substrates 15 and 16 can be arranged to face the objective lens 5 because the aberration-compensation optical unit 4 has a bidirectional capability.

Figure 5:
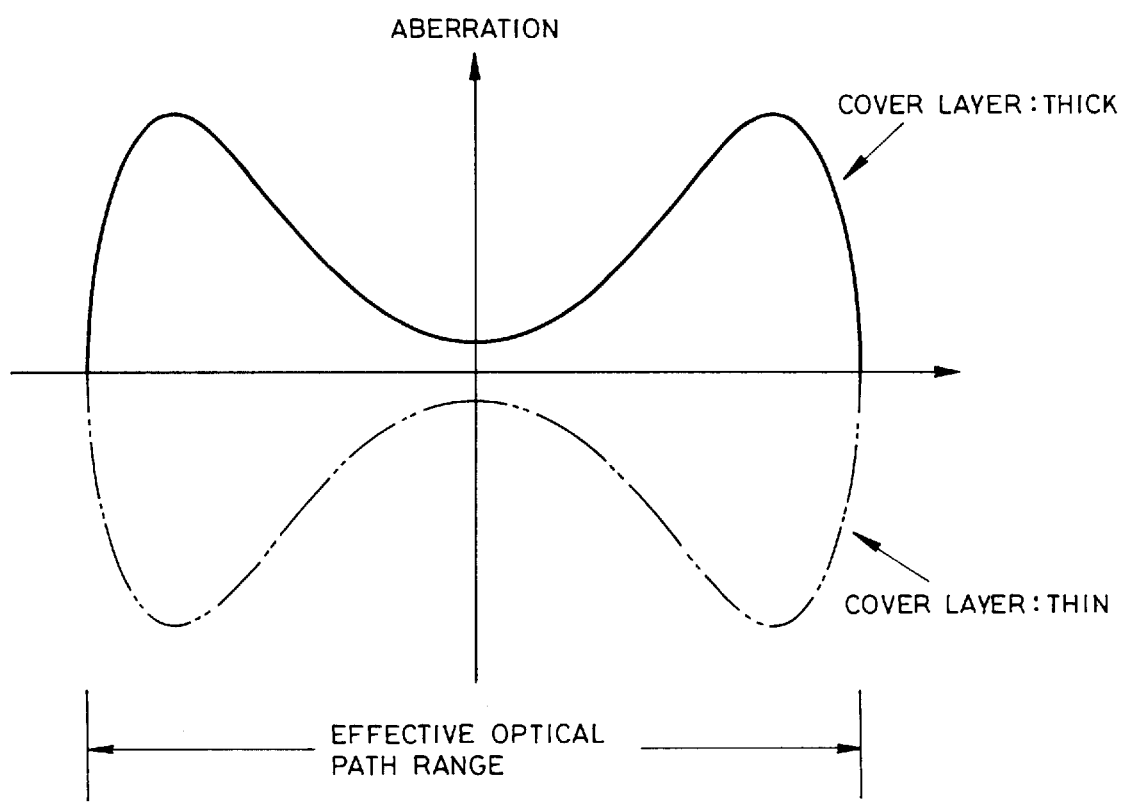
FIG. 5 is a diagram illustrating the distribution of spherical aberration in a plane perpendicular to the optical axis.

FIG. 5 illustrates a distribution of spherical aberration, which is the major part of the aberration caused by the substrate (or transparent cover layer) thickness of an optical disc, in a plane perpendicular to the optical axis. The aberration is small in the central part of the optical path when the substrate is thick, and increases as the radial position increases except at the innermost peripheral part. In contrast, when the substrate is thin, the aberration decreases as the radial position increases.

Figure 6:
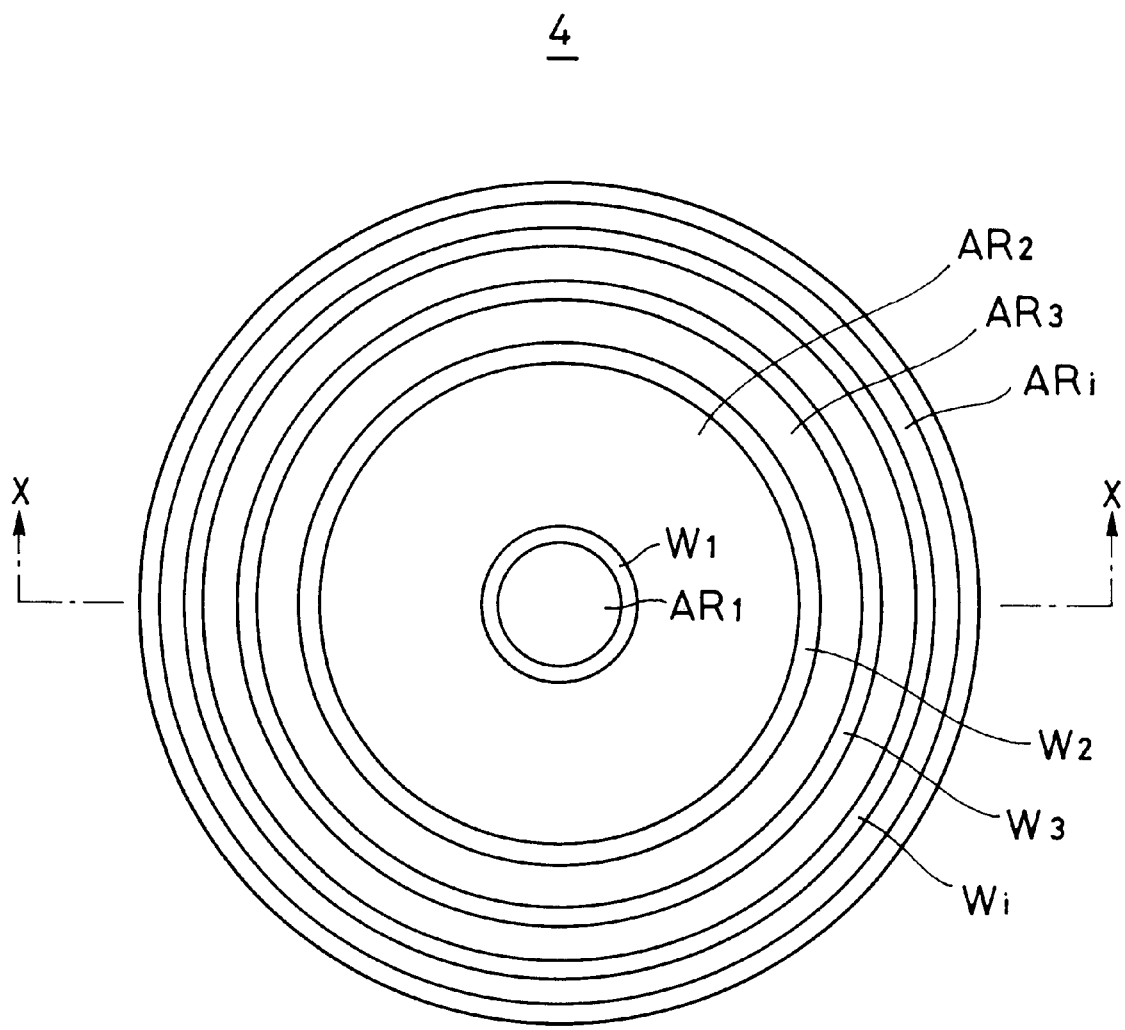
FIG. 6 is a top view illustrating a configuration of the electrodes of the aberration-compensation optical unit.

The schematic configuration of the aberration-compensation optical unit 4 for compensating for variation in the spherical aberration is shown in FIG. 6. The aberration-compensation optical unit 4 is divided into a plurality of aberration-compensation areas AR1–ARi determined correspondingly to the distribution of aberration generated by the optical disc 9. The aberration-compensation areas AR1–ARi are realized by transparent electrode (ITO: indium tin oxide) layers formed on the electrode layers 17 and 18. A typical example of the aberration-compensation areas AR1–ARi for compensating the spherical aberration caused by the optical disc 9 is shown in FIG. 6. The electrode layers 17 and 18 can be divided so as to form various shapes corresponding to the distribution of aberration caused by the optical disc 9.

Figure 7:
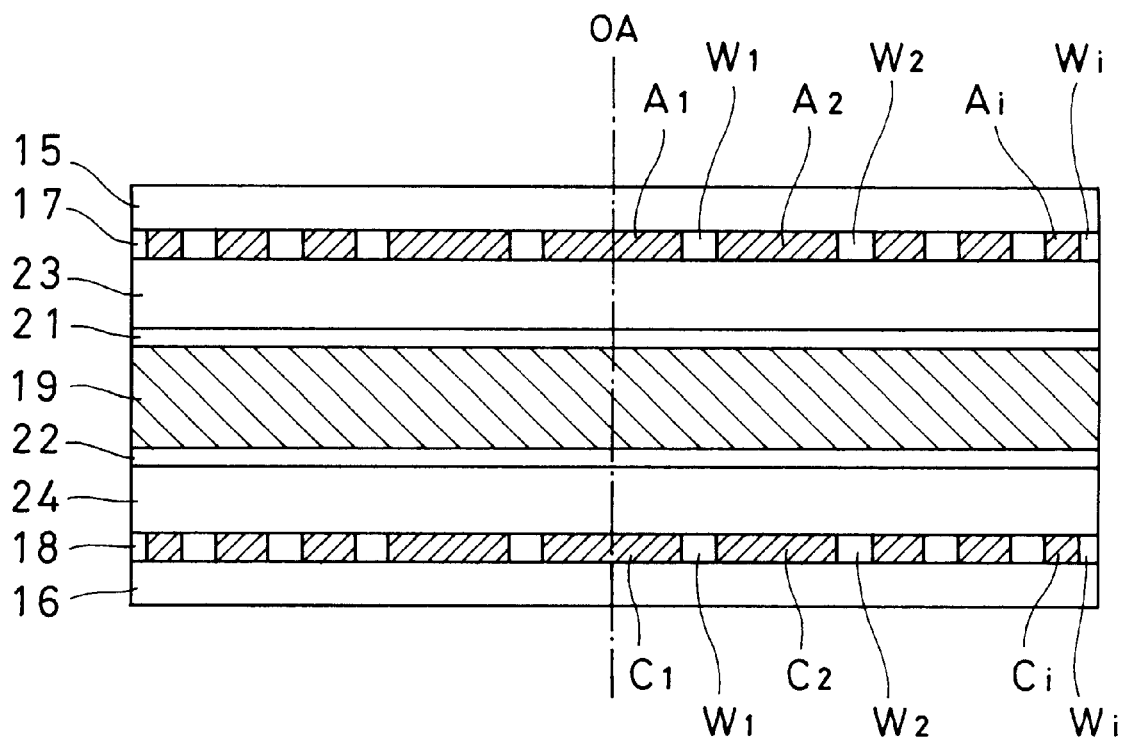
FIG. 7 is a sectional view showing the configuration of the aberration-compensation optical unit shown in FIG. 6 taken along line X—X.

A description will be given below, as an example, for the aberration-compensation optical unit 4 which has the concentric aberration-compensation areas AR1–ARi provided in the manner as shown in FIG. 6. FIG. 7 is a sectional view of the configuration along line X—X in FIG. 6. As is shown in the figure, the electrode layer 17 has a configuration consisting of divisional transparent electrodes (hereinafter, referred to as "divisional electrodes" or simply as "electrodes") A1–Ai formed electrically separated from each other, and a plurality of gaps W1–Wi existing between each of the divisional electrodes A1–Ai.

The divisional electrode A1 is formed so as to have a shape fitting that of the aberration-compensation area AR1 (a circular shape in FIG. 6), and the divisional electrode A2 is shaped so as to fit the aberration-compensation area AR2 (ring-shaped in FIG. 6). Similarly, the shapes of the remaining divisional electrodes A3–Ai are also suited to those of the aberration-compensation areas AR3–ARi. The gaps W1–Wi separating the transparent electrode layers A1–Ai are ring-shaped.

In the same manner, the electrode layer 18 comprises divisional electrodes C1–Ci formed so as to be electrically separated from each other, and a plurality of gaps W1–Wi existing between each of the divisional electrodes C1–Ci.

If one electrode layer, for example, the electrode layer 17, is formed so as to have a plurality of separated electrodes, the electrode layer 18 does not have to be separated. For instance, it may be formed as an "overall" electrode which extends over the entire surface, or formed in a required shape or separated into a required number according to the characteristic and/or the distribution of aberration to be compensated.

The aberration compensation according to the present invention will be described in detail referring to the flow charts shown in FIGS. 8–10 and FIGS. 11, 12.

Figure 8:
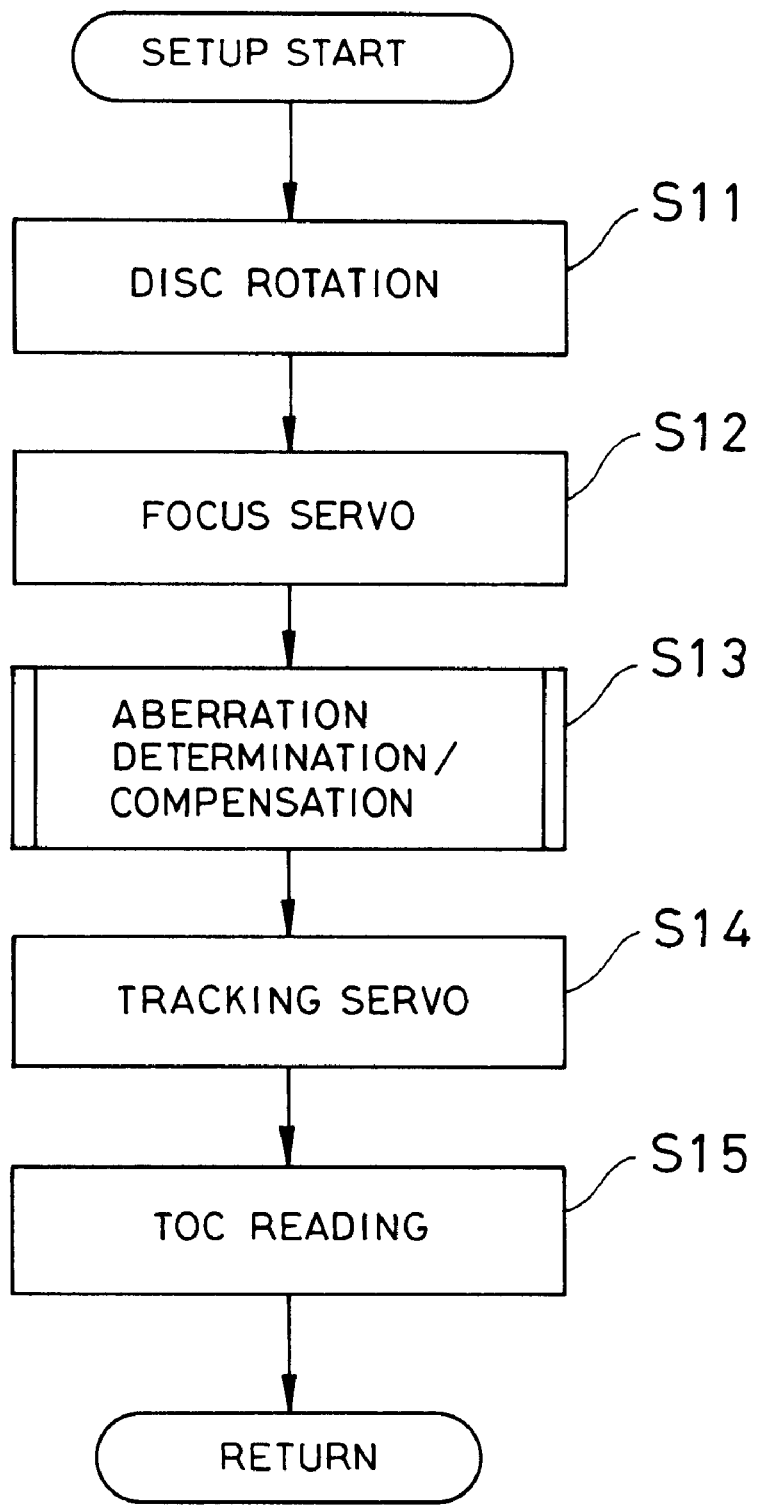
FIG. 8 is a flow chart showing the setup procedure performed by a controller at the time when an optical disc starts recording or reproduction.

The flow chart in FIG. 8 shows the setup procedure performed by the controller 12 at the time, for example, when recording or reproduction of the optical disc 9 is started.

The controller 12 controls rotation of the loaded optical disc 9 (step S11) and performs focus servo control (step S12). The controller 12, then, starts the aberration determination/compensation routine, determines the aberration to be compensated for, and performs aberration compensation according to the determination result (step S13).

After the aberration determination/compensation routine is performed following the procedures described below, the control returns to the present routine, and performs tracking servo control (step S14). Tracking servo control is followed by reading of TOC information from the optical disc 9 (step S15), and the setup procedure is terminated. The procedures of aberration determination/compensation are described below.

Figure 1:
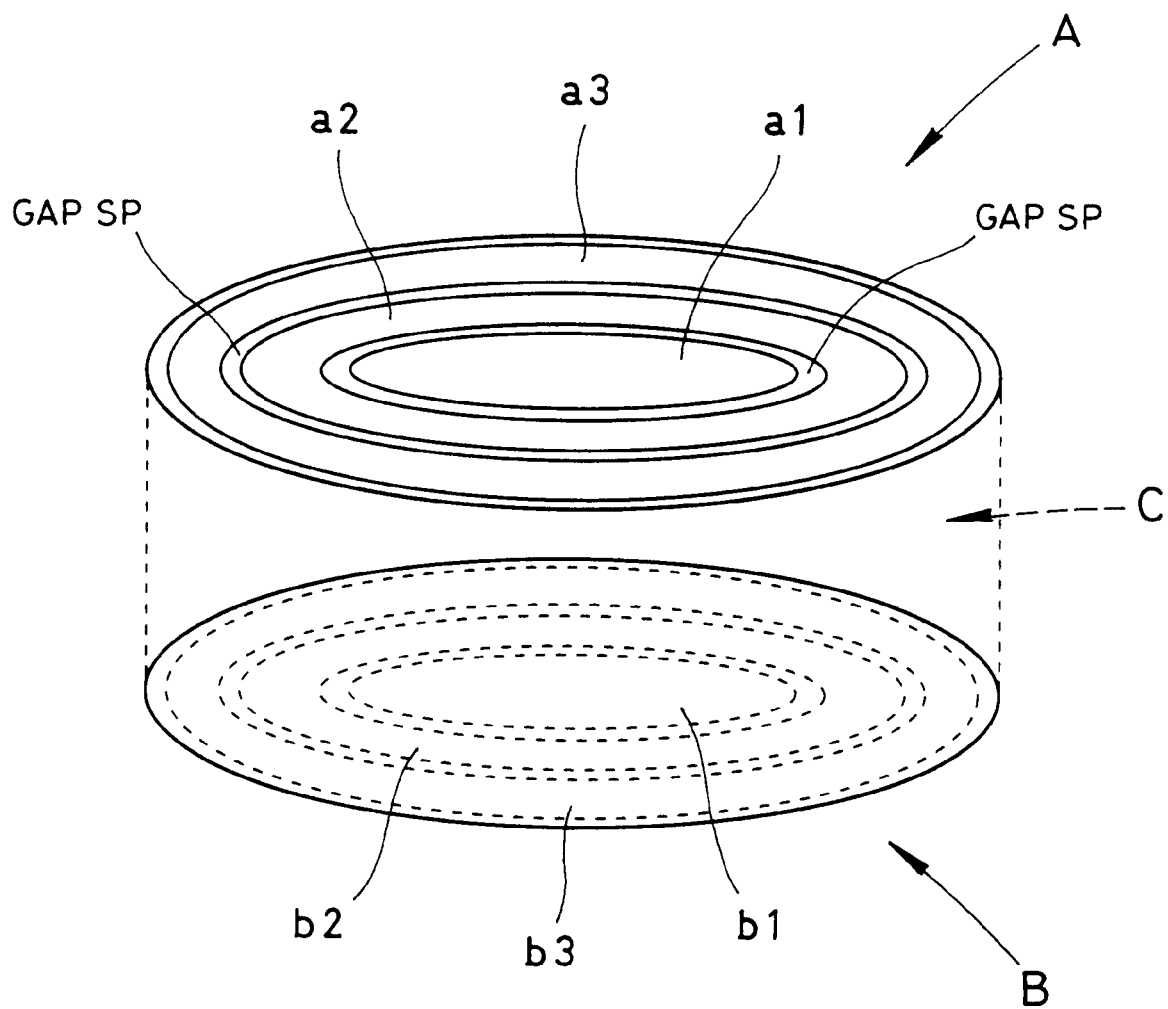
FIG. 1 is a schematic view of an example of a liquid crystal unit.
Figure 2:
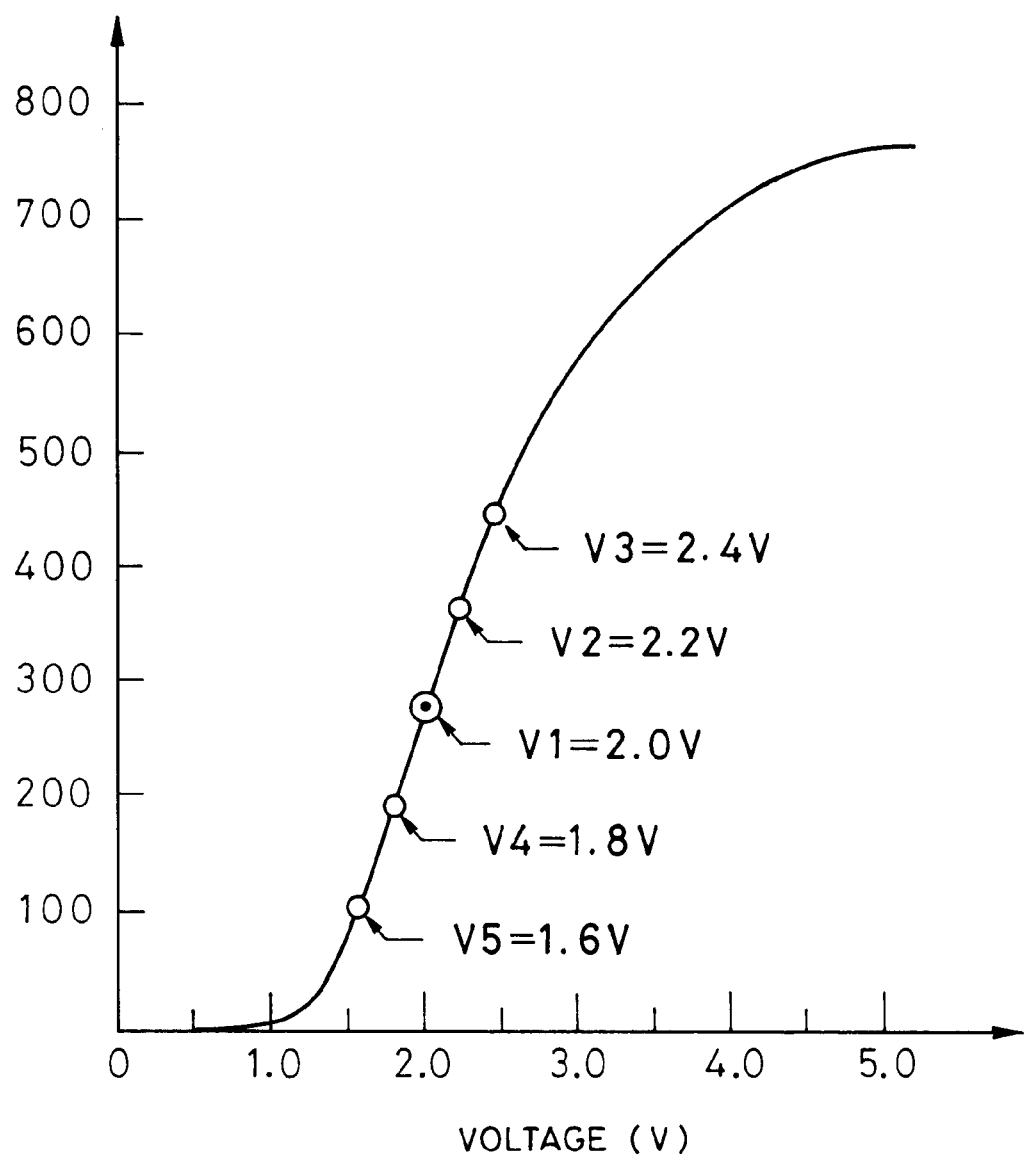
FIG. 2 is a diagram showing the phase difference characteristics for the liquid crystal element of a liquid crystal unit having concentrically divided electrodes against the applied voltage.
Figure 9:
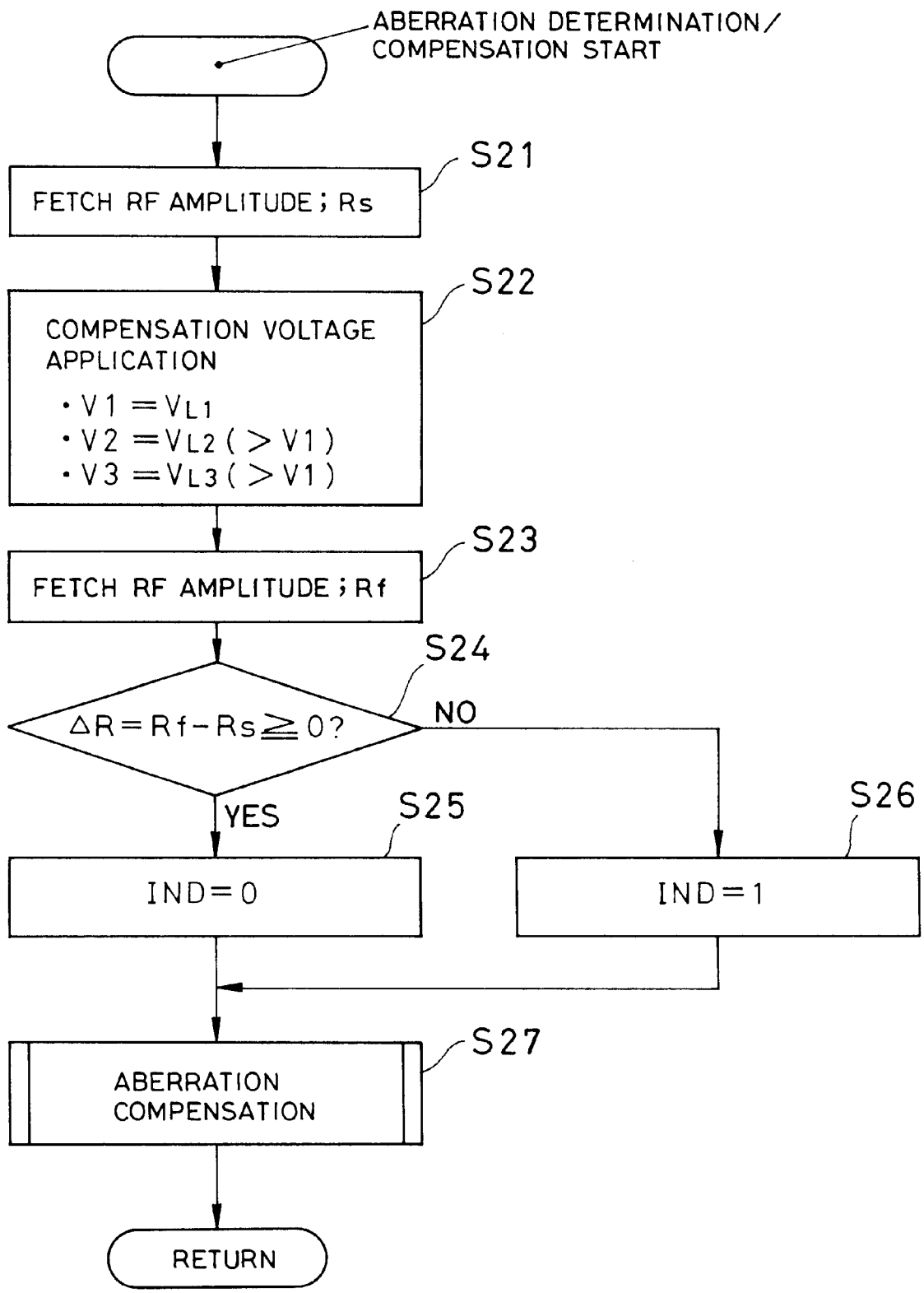
FIG. 9 is a flow chart showing the procedure of an aberration determination routine.

FIG. 9 shows the procedures of the aberration determination routine for determining the aberration to be compensated. As described referring to FIGS. 2 and 5, it is determined whether the phase difference in aberration-compensation areas other than the reference aberration-compensation area of the aberration-compensation optical unit 4 should be increased or decreased in order to compensate for the aberration of incident light. The description will be made for the aberration-compensation optical unit 4 wherein the aberration-compensation areas are formed circularly (or ring-shaped) as an example. For simplification, the description is made in which the aberration-compensation optical unit 4 comprises three aberration-compensation areas. However, the number of areas and the shapes may be changed or modified.

In FIG. 9, an RF amplitude value (Rs) is received from the RF amplitude detector 11 (step S21), and the value is stored. Then, setting the aberration-compensation area (A1) in the center of the aberration-compensation optical unit 4 as the reference, a reference voltage V1 (V1=$V_{L1}$, for example, $V_{L1}$=2.0 V) is applied to the aberration-compensation area A1. Voltages V2 and V3 (e.g. V2=$V_{L2}$, V3=$V_{L3}$), which are larger than the reference voltage V1 (for example, $V_{L2}$=2.1 V, $V_{L3}$=2.2 V), are applied to the aberration-compensation areas A2 and A3 respectively (step S22). The RF amplitude values (Rf) are fetched at the time when the compensation voltages are applied (step S23).

It is determined whether or not the RF amplitude is increased by applying the compensation voltages. In other words, whether the change amount $\Delta R$ (=Rf–Rs) of the RF amplitude value before and after the application of the compensation voltage is larger than or equal to 0 (step S24). If the change amount $\Delta R \geq 0$, it indicates that the RF amplitude is increased by applying the compensation voltages. It shows that the values of the compensation voltages are selected so as to cancel the aberration of an incident light beam. On the contrary, if the change amount $\Delta R<0$, it indicates that the compensation voltages are applied so as to enhance the aberration of the incident light beam.

At step S24, if the change amount $\Delta R \geq 0$, an indicator (IND) is set to 0 (i.e., IND=0, step S25). The indicator is used for indicating whether or not a compensation voltage value is selected so as to cancel aberration. The value (IND) is supplied to the aberration-compensation routine as an argument. If the change amount $\Delta R<0$ at step S24, the indicator is set to 1 (IND=1, step S26), and the value is supplied to the aberration-compensation routine as the argument. The aberration-compensation routine optimizes aberration compensation on the basis of the argument IND (step S27).

In the description above, the RF amplitude value before the application of the compensation voltage (i.e., the voltages for all compensation areas are 0 or the same) is used as the initial RF amplitude value (Rs). However, any method may be adopted so long as the change of the RF amplitude value can be determined when the applied voltages for compensation are changed. The aberration-compensation operation of the aberration-compensation routine will be described below.

Figure 10:
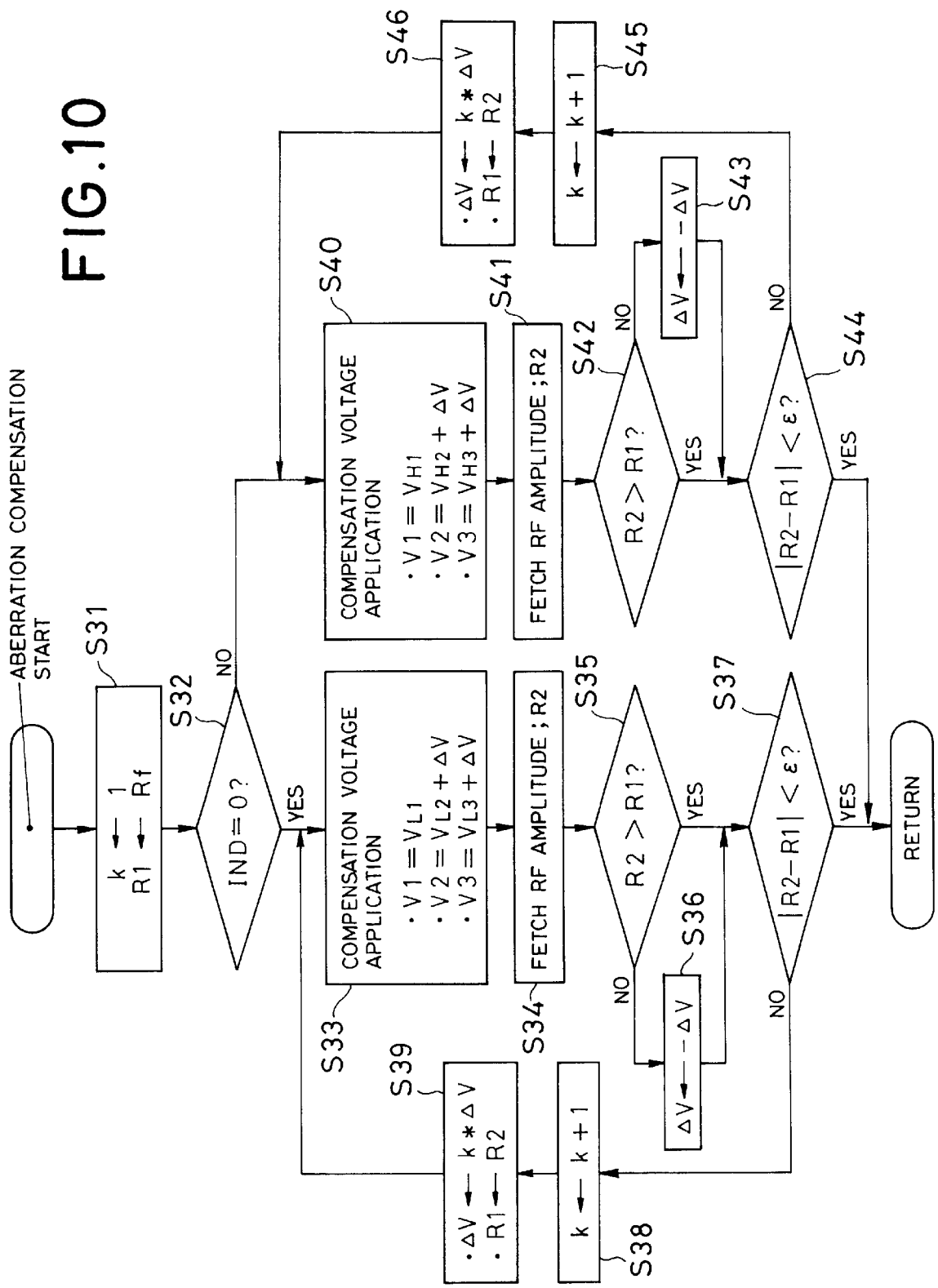
FIG. 10 is a flow chart showing the procedure of an aberration compensation routine.

The procedure of aberration compensation performed in the aberration-compensation routine is shown in FIG. 10.

The setup procedure (step S31) is performed as follows. The RF amplitude value Rf after the application of the compensation voltage obtained in the aberration-determination routine shown in FIG. 9 is set to R1, a parameter k (an integer) is set to 1, and the step-like change amount of the compensation voltage $\Delta V$ (hereinafter referred to as "voltage step") is given a predetermined value (for example, 0.1 V).

Then, it is determined whether the indicator IND is zero or not (step S32). Aberration compensation is performed on the basis of the indicator IND.

As described above, when indicator IND is zero, the reference voltage V1 which is applied to the reference compensation area A1 is set as a first reference voltage $V1=V_{L1}$ (for example, $V_{L1}=2.0$ V). The compensation voltages V2 and V3, having values larger than that of the first reference voltage V1, are applied to the compensation areas other than the reference compensation area A1 (in this case, A2 and A3) (step S33). A first compensation mode is performed by changing V2 and V3. In the present invention, aberration compensation is optimized by changing the compensation voltages V2 and V3 in a step-like manner using the voltage step $\Delta V$ (>0). A more specific description will be given below with reference to FIGS. 11 and 12.

Figure 11A:
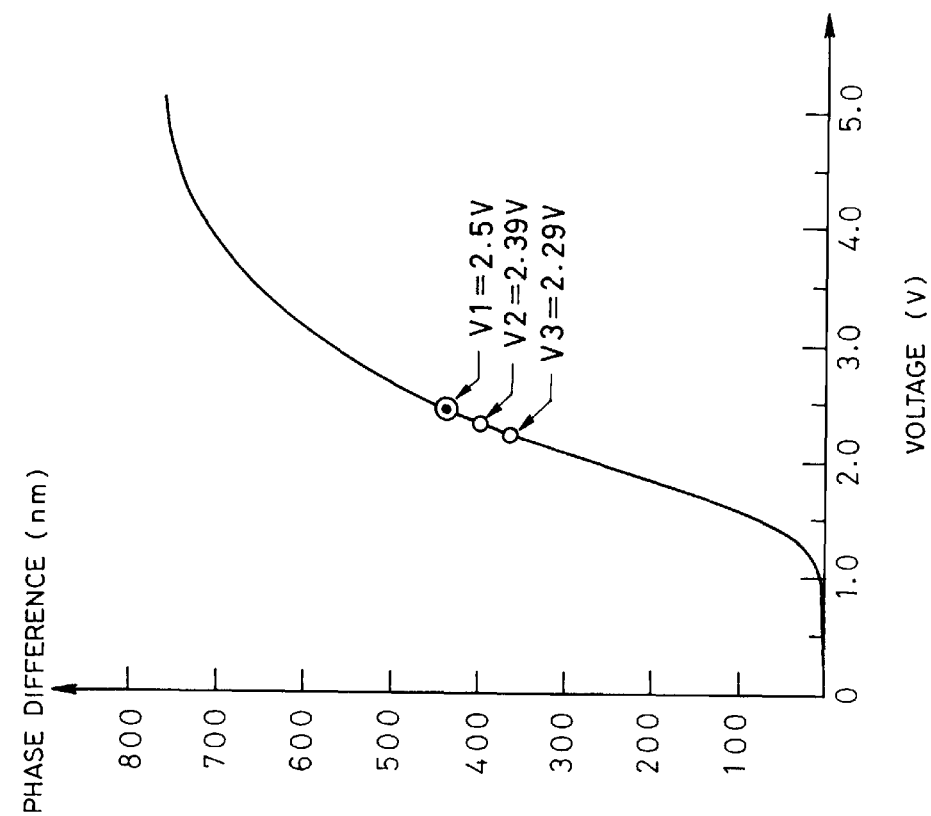
FIGS. 11A and 11B are diagrams showing the relation between the applied voltage for compensation to aberration-compensation area and the phase difference caused by a liquid crystal element.

As is shown in FIG. 11A, a voltage $$V2=V_{L2}+\Delta V\ (=2.1+0.01\times1=2.11\ V)$$

is applied to the compensation area A2. Similarly, a voltage $$V3=V_{L3}+\Delta V\ (=2.2+0.01\times1=2.21\ V)$$

is applied to the compensation area A3. The change in the applied voltage causes a change in aberration-compensation amount (this corresponds to the change from starting point S to point P1 in FIG. 12).

The RF amplitude value (R2) after the alteration of the compensation voltage is fetched (step S34). It is determined whether or not the RF amplitude is increased by the change of compensation voltage (step S35). If the change amount of RF amplitude $$\Delta R=R2-R1 \geq 0,$$

it indicates that compensation is performed so as to cancel aberration. If the change amount $\Delta R<0$ at step S35, it means that compensation is excessive. In this case, the voltage step is made negative ($-\Delta V$) so as to reduce the compensation voltage (step S36). It is determined whether the absolute value of the change amount $\Delta R$ is below a threshold, that is, whether it is below a predetermined small value ($\epsilon$) or not (step S37). If the change amount $\Delta R$ is not below the threshold, parameter k is incremented by 1 (step S 38), and the compensation voltage is increased by one voltage step ($\Delta V$) so as to replace the past RF amplitude value (R1) with the present RF amplitude value (R2) (step S39). Then, returning to step S33, the compensation voltages after the changes have been made are applied to the compensation areas other than the reference compensation area A1. The procedures at step s S33–S39 are repeated (corresponding to P2, P3, . . . in FIG. 12). If the change amount $\Delta R$ of the RF amplitude is determined to be below the threshold (point T in FIG. 12) at step S37, it is determined that the optimal compensation amount has been obtained, and the aberration-compensation routine is terminated.

Figure 11B:
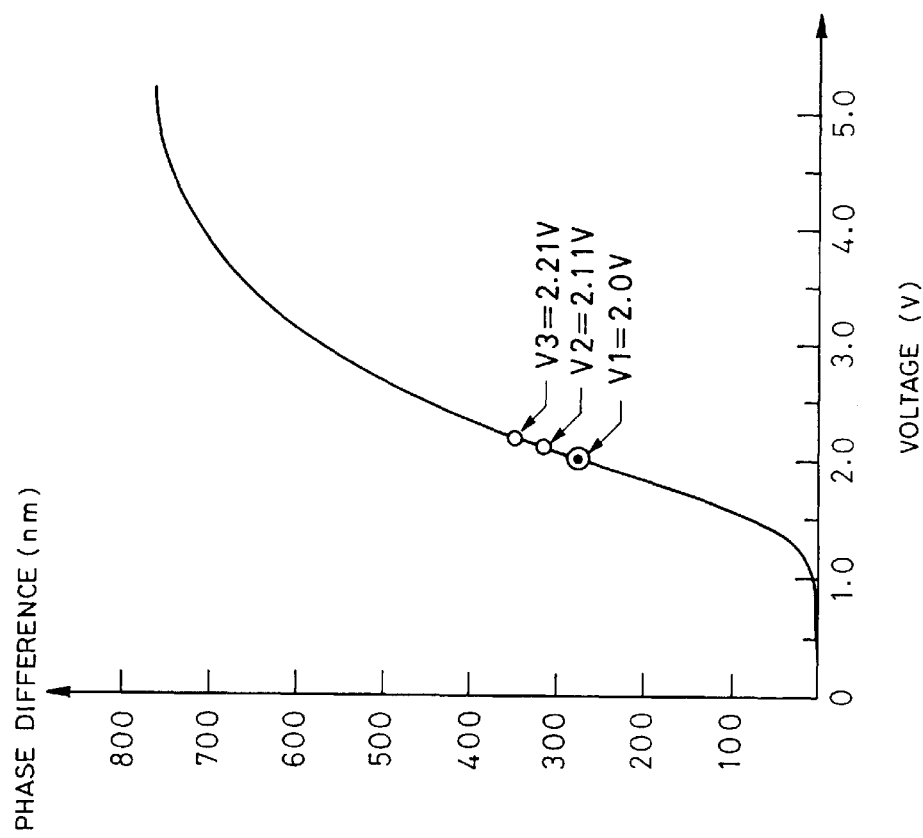
Figure 12:
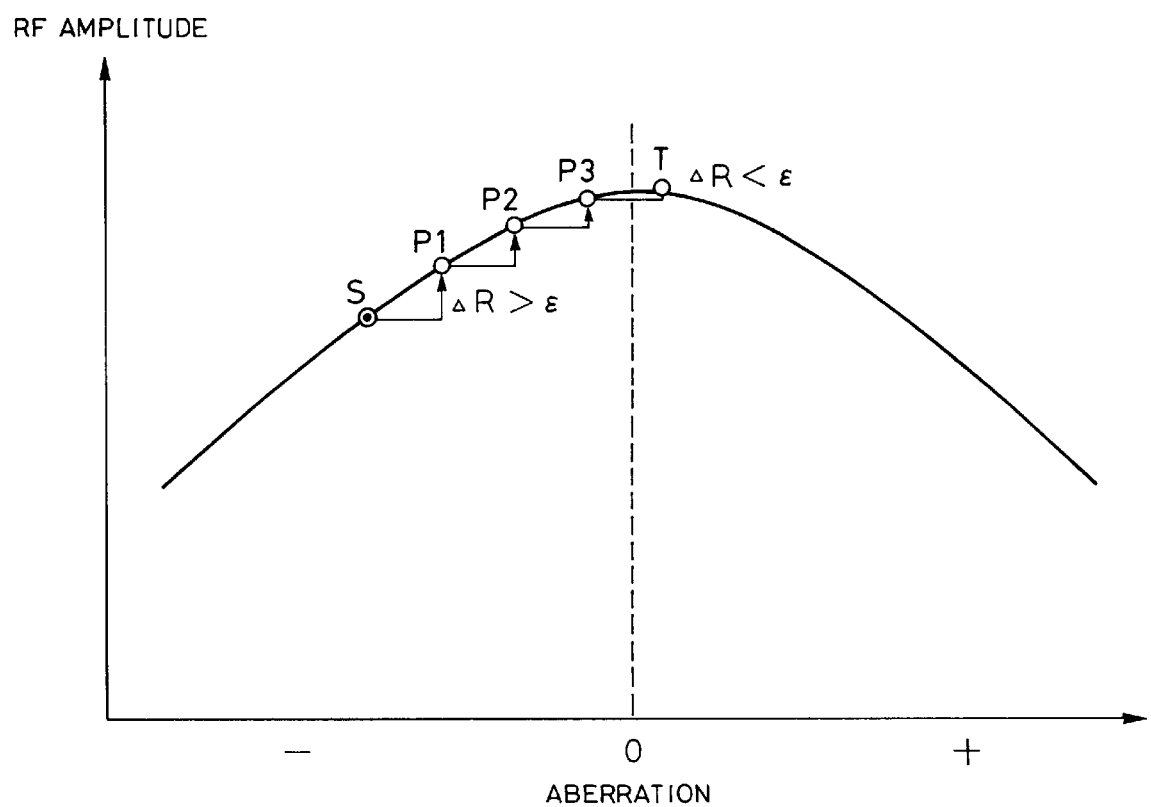
FIG. 12 is a diagram illustrating the procedure of aberration compensation performed in an aberration compensation routine.

When the indicator IND does not indicate zero at step S32, a second reference voltage $V1=V_{H1}$ (for example, $V_{H1}=2.5$ V), which is a voltage higher than the first reference voltage, is used as the reference voltage V1 to be applied to the reference compensation area A1. The compensation voltages V2 and V3 having values smaller than that of the reference voltage are applied to the compensation areas A2 and A3 other than the reference compensation area A1 (step S40). A second compensation mode is carried out by changing V2 and V3. For example, as is shown in FIG. 11B, a voltage $$V2=V_{H2}-\Delta V\ (=2.4-0.01\times1=2.39\ V)$$

is applied to the compensation area A2. In the same way, a voltage $$V3=V_{H3}-\Delta V\ (=2.3-0.01\times1=2.29\ V)$$

is applied to the compensation area A3. The aberration-compensation amount is changed by changing the applied voltages. Step S42 and the steps thereafter are performed in the similar manner as the case when the indication IND=0. Steps S40–S46 are repeated until the change amount of the RF amplitude is below the threshold ($\epsilon$). The aberration-compensation routine is terminated when the change amount of RF amplitude falls below the threshold at step S44, determining that the optimal compensation amount has been obtained. Aberration compensation is optimized through the procedures described above.

The first and second reference voltages are set so that the range of each voltage to be applied for compensation in the first and the second compensation modes overlaps. It is most desirable to set the second reference voltage to nearly the maximum value of the applied voltage for compensation in the first compensation mode.

As described above in detail, according to the present invention, the range of the applied voltage for compensation can be reduced, thus making it possible to decrease phase difference as required. This makes it possible for the liquid crystal element to be thinner and the response speed to be faster, realizing an apparatus having higher performance. It also realizes an aberration compensating apparatus which is smaller in size, lighter in weight, and lower in manufacturing cost.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

What is claimed is:

1. An aberration compensating apparatus for compensating an aberration occurring in a light beam, said light beam being applied to a recording medium and reflected by said recording medium through an optical path of an optical system, comprising:
   a liquid crystal unit including a first electrode layer having a reference electrode and divisional electrodes electrically separated from one another in the same plane and a second electrode layer, and a liquid crystal element provided between said first and second electrode layer which provides a light beam passing therethrough with a phase change when an electric field is applied;

a liquid crystal driver for driving said liquid crystal unit by applying compensation voltages and at least one of a first reference voltage and a second reference voltage to said divisional electrodes and said reference electrode, respectively;

a detector for receiving the reflected light beam passing through said liquid crystal unit to generate a detection signal; and a controller for controlling said liquid crystal driver to selectively perform either one of a first compensation mode and a second compensation mode based on the amplitude change in the detection signal caused by application of predetermined voltages for compensation-mode selection to said reference electrode and said divisional electrodes, wherein said first compensation mode is performed by applying said first reference voltage to said reference electrode and changing the compensation voltages such that the compensation voltages are larger than said first reference voltage, and said second compensation mode is performed by applying said second reference voltage to said reference electrode and changing the compensation voltages such that the compensation voltages are smaller than said second reference voltage, said second reference voltage being larger than said first reference voltage.

2. An aberration compensating apparatus according to claim 1, wherein said controller determines said first reference voltage and said second reference voltage on the basis of the phase change characteristics of said liquid crystal element.

3. An aberration compensating apparatus according to claim 1, wherein said second reference voltage does not exceed a maximum applied voltage in said first compensation mode.

4. An aberration compensating apparatus according to claim 3, wherein said controller performs said first compensation mode when amplitude of said detection signal is increased when a voltage higher than the applied voltage to said reference electrode is applied to at least one of said divisional electrodes.

5. An aberration compensating apparatus according to claim 1, wherein said controller performs said first compensation mode when amplitude of said detection signal is increased when a voltage higher than the applied voltage to said reference electrode is applied to at least one of said divisional electrodes.

6. A method of compensating an aberration occurring in a light beam, said light beam being applied to a recording medium and reflected by said recording medium through an optical path of an optical system, comprising:

providing a liquid crystal unit including a first electrode layer having a reference electrode and divisional electrodes electrically separated from one another in the same plane and a second electrode layer, and a liquid crystal element provided between said first and second electrode layer which provides a light beam passing therethrough with a phase change when an electric field is applied;

receiving the reflected light beam through said liquid crystal unit to generate a detection signal;

generating compensation voltages and at least one of a first reference voltage and a second reference voltage to be applied to said divisional electrodes and said reference electrode, respectively;

applying predetermined voltages to said reference electrode and said divisional electrodes;

discriminating whether or not said aberration is increased on the basis of an amplitude change of said detection signal caused by application of said predetermined voltages;

determining, on the basis of the phase change characteristics of said liquid crystal element, said first reference voltage and said second reference voltage, said second reference voltage being larger than said first reference voltage;

selecting either one of a first compensation mode and a second compensation mode based on the discrimination result; and performing compensation control for said aberration in a selected compensation mode, wherein said first compensation mode is performed by applying said first reference voltage to said reference electrode and changing the compensation voltages such that the compensation voltages are larger than said first reference voltage, and said second compensation mode is performed by applying said second reference voltage to said reference electrode and changing the compensation voltages such that the compensation voltages are smaller than said second reference voltage.

7. A method according to claim 6, wherein said second reference voltage does not exceed a maximum applied voltage in said first compensation mode.

8. A method according to claim 7 wherein the step of performing compensation control performs said first compensation mode when amplitude of said detection signal is increased when a voltage higher than the applied voltage to said reference electrode is applied to at least one of said divisional electrodes.

9. A method according claim 6, wherein the step of performing compensation control performs said first compensation mode when amplitude of said detection signal is increased when a voltage higher than the applied voltage to said reference electrode is applied to at least one of said divisional electrodes.

* * * * *